(12) United States Patent
Butt

(10) Patent No.: US 8,350,398 B2
(45) Date of Patent: Jan. 8, 2013

(54) AEROENGINE STARTER/GENERATOR ARRANGEMENT

(75) Inventor: David C. Butt, Derby (GB)

(73) Assignee: Rolls-Royce, PLC, London (GB)

( * ) Notice: Subject to any disclaimer, the term of this patent is extended or adjusted under 35 U.S.C. 154(b) by 689 days.

(21) Appl. No.: 12/588,810

(22) Filed: Oct. 28, 2009

(65) Prior Publication Data

US 2010/0133832 A1 Jun. 3, 2010

(30) Foreign Application Priority Data

Nov. 28, 2008 (GB) .................................. 0821684.8

(51) Int. Cl.
*F02C 3/107* (2006.01)
*F02C 7/32* (2006.01)
(52) U.S. Cl. ........................ 290/52; 60/39.163
(58) Field of Classification Search ............... 290/52; 60/39.163, 788
See application file for complete search history.

(56) References Cited

U.S. PATENT DOCUMENTS

| | | | |
|---|---|---|---|
| 3,710,576 A * | 1/1973 | Evans et al. ..................... | 60/773 |
| 7,204,090 B2 * | 4/2007 | O'Connor ........................ | 60/778 |
| 7,418,821 B2 * | 9/2008 | Butt .................................. | 60/778 |
| 7,527,476 B2 * | 5/2009 | Butt et al. ........................ | 416/191 |
| 7,543,439 B2 * | 6/2009 | Butt et al. ................... | 60/39.183 |
| 7,698,884 B2 * | 4/2010 | Maguire et al. ............ | 60/39.163 |
| 2011/0154827 A1 * | 6/2011 | Ress et al. ........................ | 60/772 |

FOREIGN PATENT DOCUMENTS

| | | |
|---|---|---|
| EP | 1 519 018 A1 | 3/2005 |
| GB | 2 429 500 A | 2/2007 |
| WO | WO 2008/082336 A1 | 7/2008 |

* cited by examiner

*Primary Examiner* — Nicholas Ponomarenko
(74) *Attorney, Agent, or Firm* — Oliff & Berridge, PLC

(57) ABSTRACT

An open-rotor gas turbine engine comprising a starter/generator, a first spool and a second spool, the second spool is of a lower pressure than the first spool; wherein the starter/generator is connected to the first and second spools via first and second clutches respectively. The method of operating the open-rotor engine comprises the step of supplying power to the starter/generator to drive the first spool via the first clutch to start the engine and, once the engine is self-propelling, a step of driving the starter/generator from the second spool via the second clutch to generate electricity.

15 Claims, 2 Drawing Sheets

AEROENGINE STARTER/GENERATOR ARRANGEMENT

The present invention relates to an open-rotor aeroengine starter/generator and clutch arrangement and a method of operating such an aeroengine.

It is well known to provide a starter/generator arrangement for gas turbine engines (GTE) of aircraft to start the engine and generate electricity for engine and aircraft systems once the engine is self-propelling.

EP1,519,018A1 describes an arrangement for starting a turbofan gas turbine engine. A starter/generator is permanently connected to an intermediate-pressure (IP) system and is also coupled via a clutch to a high-pressure (HP) system. To start the engine the generator drives both the IP and HP systems. Once self-propelling, the engine then drives the starter/generator to generate electricity via the IP system only and the HP system is de-clutched. However, this arrangement is compromised because of a higher speed range of the IP system compared to the HP system which limits the choice of clutch system.

For an open rotor GTE, having a free power turbine (FPT) driving a propeller, this prior art system is unsuitable because this would leave the starter/generator permanently connected to the FPT. This is problematic because when the engine is required to be started, the starter/generator would be required to turn both a LP shaft and the FPT shaft, hence a very large starter power would be required. This arrangement would also require a relatively long time to start the engine because of the necessary rotational speed and the requirement to get sufficient air passing through the engine for combustion. Both aspects are undesirable.

Therefore it is an object of the present invention to provide a starter/generator and clutch arrangement for an open-rotor aeroengine, which minimises the size of the starter/generator and allows sufficient air through the engine at a minimum rotational speed to drive a shaft.

In accordance with the present invention there is provided an open-rotor gas turbine engine comprising a starter/generator, a first spool and a second spool, the second spool is of a lower pressure than the first spool; wherein the starter/generator is connected to the first and second spools via one-way and oppositely driving first and second clutches respectively, wherein in a starting mode the starter/generator drives the first spool to start the engine and in a generating mode the starter/generator is driven by the second spool to generate electricity.

Preferably, the first spool is a low pressure spool and the second spool is a free power turbine spool which drives at least one propeller.

Preferably, the engine comprises two contra-rotating propellers.

Preferably, the engine comprises a gearbox arranged to connect the clutches to the starter/generator.

Preferably, at least one clutch is a sprag-type clutch. Alternatively, at least one clutch is electrically controllable via a controller.

Preferably, the second spool has a speed range between 1.1 and 2.0.

Preferably, the first spool has a speed range between 2.0 and 10.0.

In a second aspect of the present invention there is provided a method of operating an open-rotor gas turbine engine comprising a starter/generator, a first spool and a second spool, the second spool is of a lower pressure than the first spool; wherein the starter/generator is connected to the first and second spools via first and second clutches respectively, wherein the method comprises a first step of supplying power to the starter/generator to drive the first spool via the first clutch to start the engine and, once the engine is self-propelling, a second step of driving the starter/generator from the second spool via the second clutch to generate electricity.

Preferably, the two clutches are each one-way and oppositely driveable first and second clutches.

Alternatively, the two clutches are each electrically controllable. The first clutch is engaged during engine starting and is then disengaged once the engine is self-propelling. The second clutch is disengaged during engine starting and is then engaged once the engine is self-propelling.

Preferably, the second spool is kept within a speed range between 1.1 and 2.0.

Preferably, the first spool is kept within a speed range between 2.0 and 10.0.

The present invention will be more fully described by way of example with reference to the accompanying drawings in which.

Figure 1:
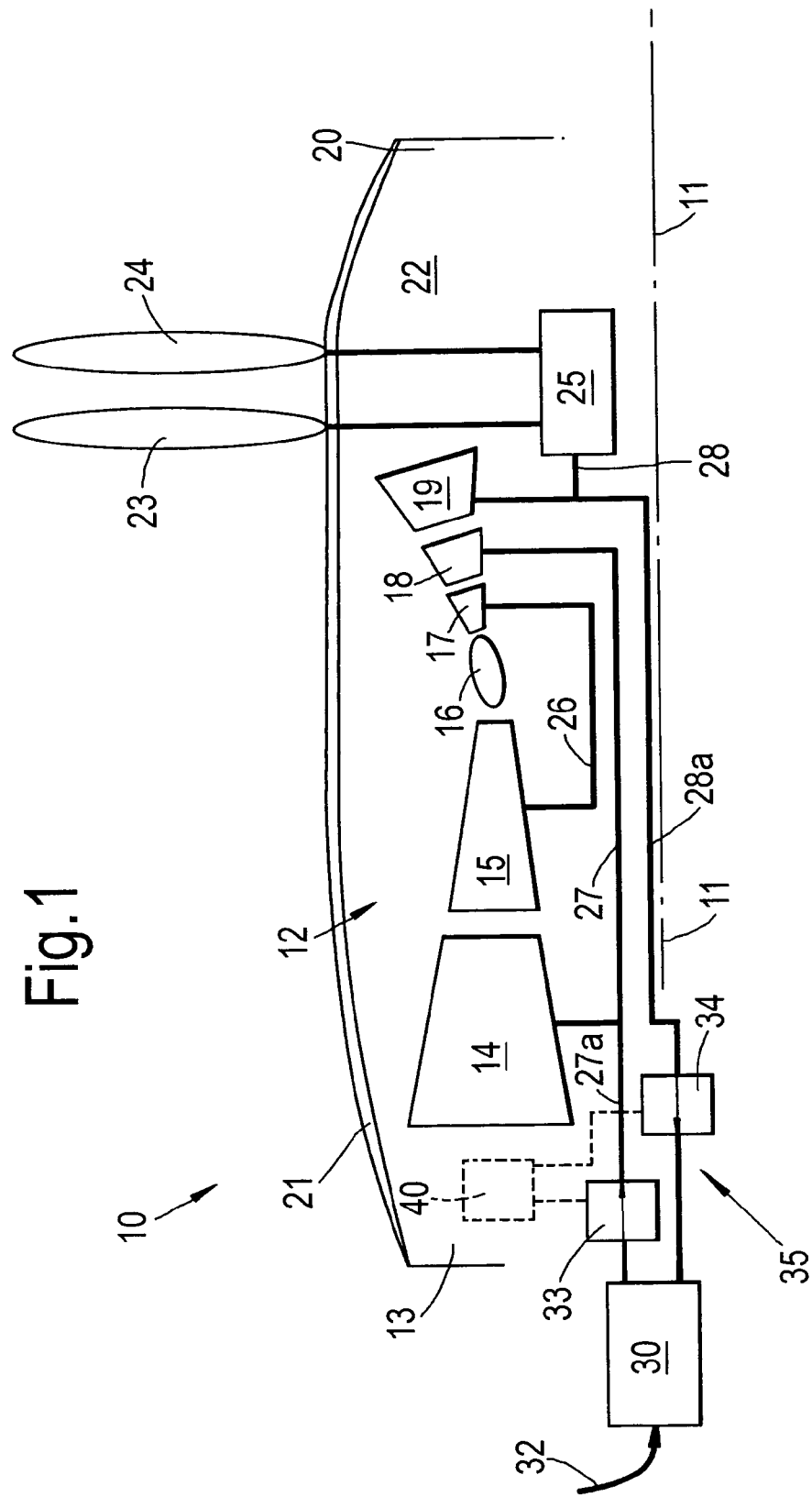
FIG. 1 is a schematic section of part of an open-rotor aeroengine incorporating a starter/generator and a clutch system in accordance with the present invention.

Referring to FIG. 1, a twin-spooled, contra-rotating propeller gas turbine engine is generally indicated at 10 and has a principal and rotational axis 11. The engine 10 comprises a core engine 12 having, in axial flow series, an air intake 13, a low pressure compressor 14 (LPC), a high-pressure compressor 15 (HPC), combustion equipment 16, a high-pressure turbine 17 (HPT), low pressure turbine 18 (LPT), a free power turbine 19 (FPT) and a core exhaust nozzle 20. A nacelle 21 generally surrounds the core engine 12 and defines the intake 13 and nozzle 20 and a core exhaust duct 22. The engine 10 also comprises two contra-rotating propellers 23, 24 attached to and driven by the free power turbine 19, via a gearbox 25. Alternatively, the free power turbine 19 may comprise contra-rotating blade arrays, as known in the art, each driving one of the propellers 23, 24.

The gas turbine engine 10 works in a conventional manner so that air entering the intake 13 is accelerated and compressed by the LPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and low pressure compressors 15, 14 and the propellers 23, 24 by suitable interconnecting HP, LP and FPT shafts 26, 27, 28 respectively. The propellers 23, 24 normally provide the majority of the propulsive thrust.

The engine 10 comprises a starter/generator 30 that is drivingly connected to the LP shaft 27 and FPT shaft 28 via drives 27a and 28a and a clutch system 35. The starter/generator 30 may be either supplied with an electrical input via cable 32 usually for starting the engine or supplying electricity, usually for aircraft and engine systems, when the engine is self-propelling.

The starter/generator 30 is selectively coupled to the LP shaft 27 via a first clutch 33 in drive 27a and is selectively coupled to the FPT shaft 28 via a second clutch 34 in drive 28a. The clutch system 35 comprises the first clutch 33 and the second clutch 34.

Figure 2:
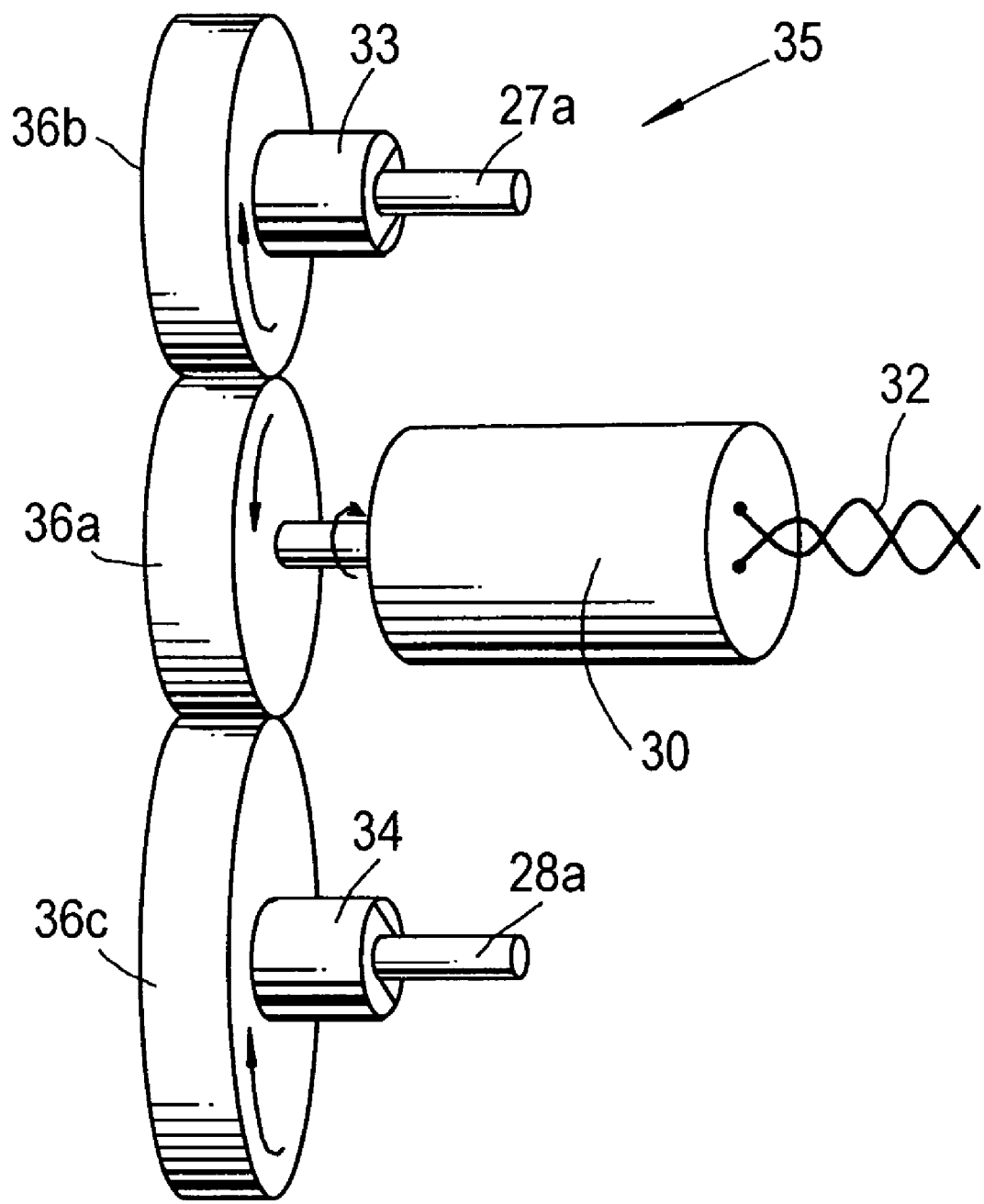
FIG. 2 is a more detailed view of a starter/generator and clutch system in accordance with the present invention.

The clutch system 35 and the starter/generator 30 are shown in more detail in FIG. 2 and to which reference is made for describing an engine starting mode and an electrical generating mode. A gearbox 36 connects the clutches 33, 34 to the starter/generator 30. The gearbox 36 comprises a gear 36a connected to the starter/generator 30, and intermeshing gears 36b and 36c connected to clutches 33 and 34 respectively.

To start the engine electricity is supplied via cable 32 to the starter/generator 30, which rotates the gear 36a anticlockwise as shown by the arrows and in turn gear 36b is rotated clockwise. The electrical supply may be either from an external source or from an auxiliary power unit of the aircraft as well known. The clutch 33, in this case a sprag type, as known, engages and drives the drive 27a which in turn rotates the LP shaft 27. This causes air to be drawn through the engine and as conventional, once sufficient rotational engine speed and pressure are achieved fuel is introduced and ignited in the combustor for the engine to then become self-propelling. The gear 36c is also rotated, however, its sprag clutch is arranged to over-run or free-wheel and the drive 28a is not rotated by the starter/generator in starting mode. Thus the engine is started through the LP system 27, 18 only.

Once the engine 10 has become self-propelling, it shafts speed up to 'ground idle' rotational speed (or faster). As the engine speeds up the FPT spool 28, 19 rotates at a sufficient speed, by virtue of the gear ratios of 36a to 36b or otherwise, to engage the sprag clutch 34 and begin to drive the starter/generator 30, at this time clutch 33 will now over run or freewheel. At this point the electrical supply to the starter/generator will have been switched off. Thus the starter/generator generates electricity, from the FPT 19, that is supplied to the aircraft and/or engine systems.

It should be appreciated that the starter/generator 30 could be operable using a hydraulic system, as known in the art, rather than electrical. Although sprag type clutches are preferable, because of their simple and passive mechanical configuration, it is possible to use other types of clutch to engage and disengage the drives 27a and 28a in accordance with the present invention. Indeed, active electronically controlled devices, such as friction plates or fluid coupling (33, 34), may be used instead of the sprag clutches 33, 34 wherein an engine electronic controller 40 (commonly known as a FADEC) is programmable to control their operation. Thus here the method of operating the engine comprises engaging the first clutch 33 during engine starting and then disengaged it once the engine is self-propelling. The method also comprises the step of disengaging the second clutch 33 during engine starting and then engaging it once the engine is self-propelling.

The preferred arrangement, however, is the simple passive clutch system 35, which is possible due to the small speed range of the FPT spool 28, 19 of the open rotor GTE. Generally, an open rotor GTE operates with its FPT at a more constant rotational speed with thrust modulated by changing the pitch of the propellers 23, 24. A speed range is defined as max operating speed/idle speed. The rotational speed range of the FPT spool 19 is predicted to be between 1.1 and 2.0 and a preferable operational value is approximately 1.3; this is against a speed range of about 2.2 for the LP spool 18. Hence the greater LP spool speed range will ensure that it will accelerate away from the speed of the FPT shaft ensuring the first clutch 33 will always over-run when the engine is self-propelling.

The open-rotor engine incorporating the present invention is advantaged by increased engine efficiency resulting is a lower fuel consumption by driving the generators from the FPT. This is because of the higher efficiency of the FPT and its lower speed range.

Another advantage is experienced because the FPT spool has a relatively lower speed range that allows the generators to be reduced in size & weight, compared to ones that would be necessary if driven by the LP system 18 or HP system 17.

The present invention is particularly advantageous because the small speed range of the FPT spool allows simple passive over-running clutches to be used. These clutches do not require engine electronic controller interfaces, power supplies and actuation systems.

It should be appreciated by the skilled artisan that the present invention is adaptable to two and three shaft gas turbine engines, as well as 'open rotor' configurations and ducted turbofan engines, whether adapted to marine or industrial use.

The invention claimed is:

1. An open-rotor gas turbine engine comprising a starter/generator, a first spool and a second spool, the second spool is of a lower pressure than the first spool; wherein the starter/generator is connected to the first and second spools via one-way and oppositely driving first and second clutches respectively, wherein in a starting mode the starter/generator drives the first spool to start the engine and in a generating mode the starter/generator is driven by the second spool to generate electricity.

2. An open-rotor gas turbine engine as claimed in claim 1 wherein the first spool is a low pressure spool and the second spool is a free power turbine spool which drives at least one propeller.

3. An open-rotor gas turbine engine as claimed in claim 1 wherein the engine comprises two contra-rotating propellers.

4. An open-rotor gas turbine engine as claimed in claim 1 wherein the engine comprises a gearbox arranged to connect the clutches to the starter/generator.

5. An open-rotor gas turbine engine as claimed in claim 1 wherein at least one clutch is a sprag-type clutch.

6. An open-rotor gas turbine engine as claimed in claim 1 wherein at least one clutch is electrically controllable via a controller.

7. An open-rotor gas turbine engine as claimed in claim 1 wherein the second spool has a speed range between 1.1 and 2.0.

8. An open-rotor gas turbine engine as claimed in claim 1 wherein the first spool has a speed range between 2.0 and 10.0.

9. A method of operating an open-rotor gas turbine engine comprising a starter/generator, a first spool and a second spool, the second spool is of a lower pressure than the first spool; wherein the starter/generator is connected to the first and second spools via first and second clutches respectively, wherein the method comprises a first step of supplying power to the starter/generator to drive the first spool via the first clutch to start the engine and, once the engine is self-propelling, a second step of driving the starter/generator from the second spool via the second clutch to generate electricity.

10. A method of operating an open-rotor gas turbine engine as claimed in claim 9 wherein the two clutches are each one-way and oppositely driveable first and second clutches.

11. A method of operating an open-rotor gas turbine engine as claimed in claim 9 wherein the two clutches are each electrically controllable.

12. A method of operating an open-rotor gas turbine engine as claimed in claim 11 wherein the first clutch is engaged during engine starting and is then disengaged once the engine is self-propelling.

13. A method of operating an open-rotor gas turbine engine as claimed in claim 11 wherein the second clutch is disengaged during engine starting and is then engaged once the engine is self-propelling.

14. A method of operating an open-rotor gas turbine engine as claimed in claim 9 wherein the second spool is kept within a speed range between 1.1 and 2.0.

15. A method of operating an open-rotor gas turbine engine as claimed in claim 9 wherein the first spool is kept within a speed range between 2.0 and 10.0.

\* \* \* \* \*